(12) United States Patent
Norman, Jr.

(10) Patent No.: US 12,395,313 B1
(45) Date of Patent: Aug. 19, 2025

(54) METHODS AND SENSOR ARRAY PLATFORMS FOR CREATING AND MONITORING CRYPTOGRAPHIC BLOCKCHAIN IMAGES AND EXECUTING PROGRAMS BASED ON MONITORED IMAGES

(71) Applicant: Kimball John Norman, Jr., McKinney, TX (US)

(72) Inventor: Kimball John Norman, Jr., McKinney, TX (US)

(73) Assignee: Response Images, LLC, Dallas, TX (US)

( * ) Notice: Subject to any disclaimer, the term of this patent is extended or adjusted under 35 U.S.C. 154(b) by 149 days.

(21) Appl. No.: 17/460,066

(22) Filed: Aug. 27, 2021

Related U.S. Application Data (60) Provisional application No. 63/103,828, filed on Aug. 28, 2020.

(51) Int. Cl.
*H04L 9/00* (2022.01)

(52) U.S. Cl.
CPC . *H04L 9/00* (2013.01); *H04L 9/50* (2022.05)

(58) Field of Classification Search
CPC .................................. H04L 9/00; H04L 9/50
See application file for complete search history.

(56) References Cited

U.S. PATENT DOCUMENTS

| | | | | |
|---|---|---|---|---|
| 8,301,610 B2 * | 10/2012 | Driesen | ............... | G06F 16/2477 |
| | | | | 707/706 |
| 10,360,688 B2 * | 7/2019 | Saquib | ................. | G06T 3/0093 |
| 10,361,866 B1 * | 7/2019 | McGregor | ............ | H04L 9/0637 |
| 10,497,063 B2 * | 12/2019 | Lehman | ................ | G06Q 20/322 |
| 10,565,358 B1 * | 2/2020 | Bertsch | ................. | H04L 63/123 |
| 10,878,388 B2 * | 12/2020 | Wang | ................. | G06Q 20/0655 |
| 10,891,694 B1 * | 1/2021 | Leise | .................... | G08G 1/0112 |
| 11,057,240 B2 * | 7/2021 | Skertic | ............... | G05B 19/0421 |
| 11,250,485 B2 * | 2/2022 | Fox | ......................... | G06F 16/54 |
| 11,281,940 B2 * | 3/2022 | Toyoda | ................. | G06F 18/214 |
| 11,297,500 B2 * | 4/2022 | Jain | ....................... | H04L 9/3297 |
| 11,334,882 B1 * | 5/2022 | Jameson | ............... | H04L 9/3231 |
| 11,651,346 B1 * | 5/2023 | Medina, III | ............. | G07G 1/01 |
| | | | | 705/24 |
| 11,710,280 B1 * | 7/2023 | Durairaj | .................. | G06T 17/00 |
| | | | | 345/419 |
| 11,838,400 B2 * | 12/2023 | Givental | ............... | H04L 9/0618 |

(Continued)

FOREIGN PATENT DOCUMENTS

WO    WO-2019108168 A1 *   6/2019  ............. G06F 21/10

OTHER PUBLICATIONS

Senkyire et al; "Validation of Forensic Crime Scene Images Using Watermarking and Cryptographic Blockchain", 2019, IEEE, pp. 1-4. (Year: 2019).*

*Primary Examiner* — Matthew Smithers
(74) *Attorney, Agent, or Firm* — Edward B. Weller (57) ABSTRACT

In one embodiment, a sensor array platform creates and monitors cryptographic blockchain images and executes programs based on monitored images and methods therefor. In one embodiment, a method comprises generating a cryptographic blockchain image; placing the cryptographic blockchain image on an object or in a location; detecting the cryptographic blockchain image; and associating the detected cryptographic blockchain image with a user.

19 Claims, 6 Drawing Sheets

(56) References Cited

U.S. PATENT DOCUMENTS

| | | | |
|---|---|---|---|
| 11,962,432 B2* | 4/2024 | Mishelevich | H04L 12/12 |
| 2010/0002070 A1* | 1/2010 | Ahiska | H04N 7/181 |
| | | | 348/E7.001 |
| 2015/0371219 A1* | 12/2015 | Ljujic | G06Q 40/02 |
| | | | 358/1.18 |
| 2017/0206532 A1* | 7/2017 | Choi | G06Q 30/02 |
| 2018/0227293 A1* | 8/2018 | Uhr | H04L 9/3268 |
| 2019/0102163 A1* | 4/2019 | Witherspoon | G06F 8/65 |
| 2019/0166101 A1* | 5/2019 | Ramos | G06Q 50/265 |
| 2019/0173884 A1* | 6/2019 | Vincent | G06Q 20/389 |
| 2019/0228409 A1* | 7/2019 | Madisetti | G06Q 40/03 |
| 2019/0378192 A1* | 12/2019 | Fox | G06F 16/5866 |
| 2019/0385238 A1* | 12/2019 | Bowers | G06Q 40/08 |
| 2019/0385269 A1* | 12/2019 | Zachary | H04N 7/188 |
| 2020/0019864 A1* | 1/2020 | Gu | G05B 19/4183 |
| 2020/0034945 A1* | 1/2020 | Soundararajan | H04L 9/3271 |
| 2020/0162236 A1* | 5/2020 | Miller | G06F 40/174 |
| 2020/0169407 A1* | 5/2020 | Wei | H04L 63/10 |
| 2020/0213110 A1* | 7/2020 | Cage | G06F 16/182 |
| 2020/0242215 A1* | 7/2020 | Zou | G06Q 20/405 |
| 2020/0265124 A1* | 8/2020 | Li | H04L 9/0637 |
| 2020/0293500 A1* | 9/2020 | Patil | H04L 9/3239 |
| 2020/0302029 A1* | 9/2020 | Holm | G06T 15/503 |
| 2020/0341702 A1* | 10/2020 | Kosaka | G06F 21/608 |
| 2020/0357198 A1* | 11/2020 | Bennett | G06F 16/27 |
| 2020/0364456 A1* | 11/2020 | Tran | B64C 39/024 |
| 2020/0382285 A1* | 12/2020 | Nuzzi | H04L 9/0643 |
| 2021/0073019 A1* | 3/2021 | Murray | H04L 9/3239 |
| 2021/0097484 A1* | 4/2021 | Ramos | G06V 20/52 |
| 2021/0173903 A1* | 6/2021 | Choudhury | G06F 16/2255 |
| 2021/0192003 A1* | 6/2021 | Kargaran | G06F 16/9554 |
| 2021/0194699 A1* | 6/2021 | Tatonetti | H04N 7/025 |
| 2021/0203555 A1* | 7/2021 | Kulkarni | H04L 67/10 |
| 2021/0272037 A1* | 9/2021 | Hanebeck | H04W 4/35 |
| 2021/0279014 A1* | 9/2021 | Kim | G06F 3/1285 |
| 2021/0303546 A1* | 9/2021 | Bell | G06F 16/9535 |
| 2021/0306133 A1* | 9/2021 | Mathew | H04L 9/3297 |
| 2021/0326992 A1* | 10/2021 | Leise | G06N 20/00 |
| 2021/0390533 A1* | 12/2021 | Fan | G06Q 20/3825 |
| 2021/0406920 A1* | 12/2021 | McLaney | G06Q 20/389 |
| 2022/0027912 A1* | 1/2022 | Chaum | G06Q 20/409 |
| 2022/0058241 A1* | 2/2022 | Ekberg | H04N 21/4627 |
| 2022/0131705 A1* | 4/2022 | Venkatesh | G06F 3/1287 |
| 2022/0165098 A1* | 5/2022 | Hausman | H04L 9/3239 |
| 2022/0277437 A1* | 9/2022 | McGregor | H04N 1/32283 |
| 2022/0292769 A1* | 9/2022 | Kato | G06V 20/17 |
| 2022/0407912 A1* | 12/2022 | Paczkowski | G06N 5/043 |
| 2024/0127358 A1* | 4/2024 | Mathur | G06Q 40/08 |

* cited by examiner

Determine the included user request in the cryptographic blockchain image to determine the programs to be executed
802

↓

Transmit a command signal to execute the determined programs
804

Create a cryptographic blockchain ledger image from the cryptographic blockchain image
902

↓

Store, in a distributed ledger, the cryptographic blockchain ledger image
904

Figure 9

METHODS AND SENSOR ARRAY PLATFORMS FOR CREATING AND MONITORING CRYPTOGRAPHIC BLOCKCHAIN IMAGES AND EXECUTING PROGRAMS BASED ON MONITORED IMAGES

RELATED APPLICATIONS

This application claims the benefit under 35 USC § 119 to U.S. Provisional Patent Application Ser. No. 63/103,828 filed on Aug. 28, 2020, which is incorporated by reference herein in its entirety.

BACKGROUND

The disclosure relates to satellites, drones and other hardware equipped with image/spectra sensors, and, more particularly, communication systems for hardware systems and communications from a distance with users lacking a radio frequency device.

Unless otherwise indicated herein, the approaches described in this section are not admitted to be prior art by inclusion in this section.

Throughout history long distance communication methods have been vital to informing people far away of events that are taking place without direct human contact from messengers. A few examples of these are signal fires, smoke signals, the use of percussion instruments, and mirrors reflecting light to distant observers in a predetermined distinguishable pattern that can be observed and interpreted to communicate a message. Long distance and localized communication methods are still needed in many areas where there are no cellular networks, in large areas of wilderness and over vast areas of the oceans. It is desired to have a communication system to those underserved areas and areas where modern electronic systems may be affected by natural disasters or manmade events. It is also desired to have a communication system that can also be utilized in addition to current communication systems providing additional information and security improving communication.

SUMMARY

The present disclosure provides for methods and sensor array platforms for creating and monitoring cryptographic blockchain images and executing programs based on monitored images and methods therefor. In one embodiment, a method comprises generating a cryptographic blockchain image; placing the cryptographic blockchain image on an object or in a location; detecting the cryptographic blockchain image; and associating the detected cryptographic blockchain image with a user.

In one embodiment, the method further comprises determining the location of the cryptographic blockchain image; and associating the location with the user.

In one embodiment, the method further comprises receiving a user request for programs to be executed in response to associating the detected cryptographic blockchain image with a user; and including the user request in the cryptographic blockchain image.

In one embodiment, associating the detected cryptographic blockchain image with a user includes determining the included user request in the cryptographic blockchain image to determine the programs to be executed; and transmitting a command signal to execute the determined programs.

In one embodiment, the method further comprises receiving another user request for other programs to be executed in response to associating the detected cryptographic blockchain image with a user; and including another user request in the cryptographic blockchain image In one embodiment, the method further comprises creating a cryptographic blockchain ledger image from the cryptographic blockchain image; and storing, in a distributed ledger, the cryptographic blockchain ledger image.

In one embodiment, the disclosure provides for a system comprising a processor configured to execute computer program instructions and a non-transitory computer-readable storage medium storing computer program instructions executable by the processor to perform actions of the methods herein.

In one embodiment, the disclosure provides for a non-transitory computer-readable storage medium storing computer program instructions executable by a processor to perform actions of the methods herein.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

The disclosure describes a hardware platform that can be comprised of artificial intelligence (AI) cryptographic blockchain communication system programs for the creation, distribution, monitoring for and identification of cryptographic blockchain images.

Figure 1:
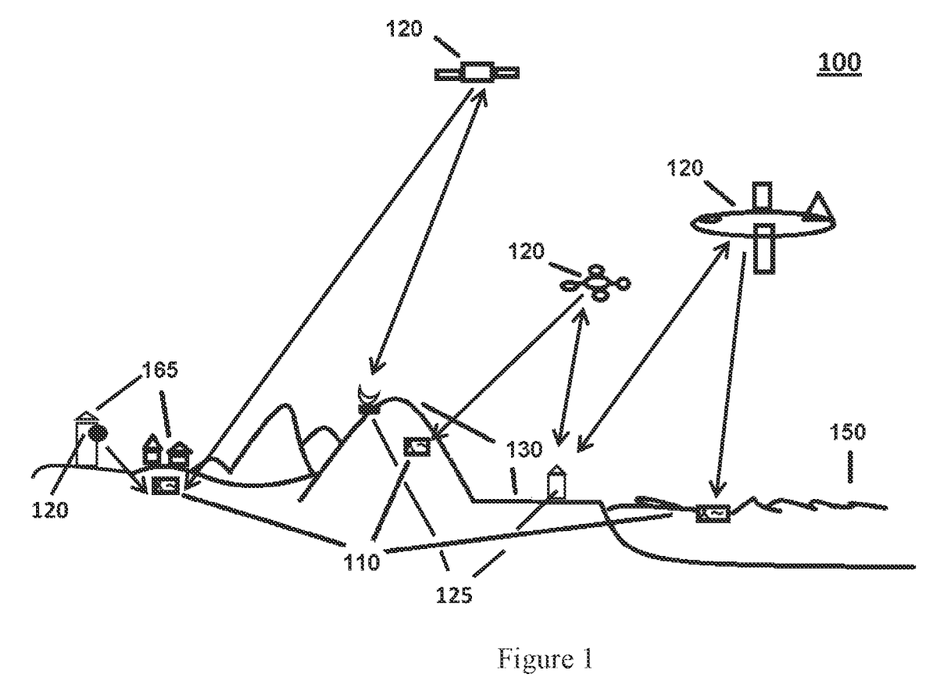
FIG. 1 illustrates a pictorial diagram of a scalable sensor array platform; utilized by the platform system, which can be established locally, regionally, nationally, internationally or globally according to one embodiment.

FIG. 1 illustrates a pictorial diagram of a scalable sensor array platform 100 that can be established locally, regionally, nationally, internationally or globally according to one embodiment. The platform 100 comprises a plurality of sensor platforms 120. The sensor platforms 120 may include electronic image and/or spectra sensors. The sensor platforms 120 may be mounted on handheld devices, electronic terminals, satellites, drones, aerial vehicles, the earth's surface, and inside or outside manmade structures 165. The sensor platform 120 is also referred to herein as sensor 120 for convenience.

The programmable cryptographic blockchain image 110 is also referred to herein as image 110 for convenience. The account holder is provided by an AI processor 125 a schedule of optimal viewing by sensors 120 that includes other instructions on how to optimize the search ability of the cryptographic hardware output image 110.

Images 110 can be positioned, individually or in groups, on the earth's surface 130 and/or on, above, and below surfaces of water bodies 150. In various embodiments, images 110 are affixed to vehicles, planes, image banners that can be placed, moved, and placed again in a different location, on buildings, tents, temporary shelter structures, lifejackets or other clothing apparel, accessories and as an electronic file to display the image 110 on an electronic display according to some embodiments. The images 110 can be identified and read by any one or a combination of sensors 120.

The images 110 can be made and comprised of any one or a combination of an account holders individual's design accepted for use in the platform 100, an electronic projection screen displaying one or a various number of images 110, spectra sensitive materials woven or printed into or on various materials including, but not limited, to heat producing fibers for thermal detection by sensors 120, printed on vinyl, stickers, wool or other unique cryptographic patterns designed and produced by the platform 100 of varying shapes and sizes. The images 110 can be formed of spectra sensitive materials identifiable and readable by any one or a combination of the sensors 120.

The AI system 125 comprises programs that activate a series of executables that can include but not be limited to confirming and positioning the location of images 110 on a map, sending email, text, instruction, inventory number, required or requested action that has been correlated with the image 110 and a file containing these instructions stored in the memory of the platform described below in further detail in conjunction with FIGS. 2 and 3. In response to the sensor 120 identifying and reading an image 110, the AI system 125 executes one or more programs. These responses can be preprogrammed by account holders of the platform 100 for each image 110 that is associated with their account and has been detected and read by the sensors 120 which is further described below in conjunction with FIG. 3. The account holder may change the settings of the account holder to reprogram the response of the AI system 125 based on the changed setting while using the same image 110. The settings described below in conjunction with FIG. 3 may be done as initial programming or reprogramming by the account holder.

Figure 2:
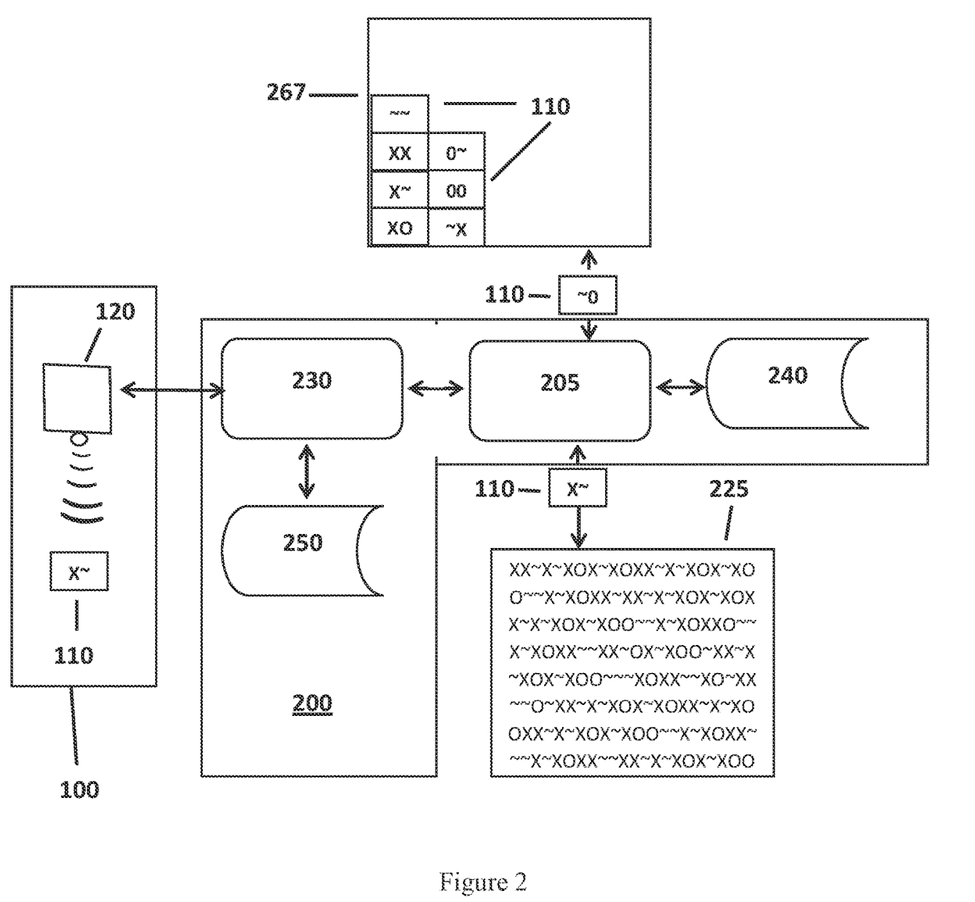
FIG. 2 is a block diagram illustrating a platform system for creating and identifying the image according to one embodiment.

FIG. 2 is a block diagram illustrating a platform system 200 for creating and identifying the image 110 according to one embodiment. The platform system 200 comprises a processor 230 coupled to the sensor 120 and further comprises a memory 250 coupled to the processor 230 coupled to an AI processor 205 coupled to a cryptographic blockchain distributed ledger (DL) 240. The cryptographic blockchain distributed ledger (DL) is also referred to herein as DL 240 for convenience. The platform system 200 tasks the artificial intelligence (AI) program processor 205 to create, assign, and manage a DL 240 for the images 110. The processor 230 executes instructions stored in the memory 250 to acquire, detect, identify, and execute the settings saved by the account holder for the image 110 further described below in FIG. 3.

The platform system 200 can also operate as a standalone system. The platform system 200 may be integrated in the operations of a CPU or other processing hardware as a standalone platform system 200 for private users (e.g., no public access such as for business or government use). In various embodiments, the standalone platform system 200 can be incorporated into but not be limited to one or more of the following: desktop computers, laptops, handheld devices, and Universal Serial Bus (USB) memory sticks, CPUs in home electronics, automobiles, and industrial equipment, and standalone hard drives with independent power supplies and an operating system. Existing or newly created paper documents can be labeled with images 110 in order to rename, organize, and secure them in the platform systems 200 distributed ledger (DL) 240.

In some embodiments, images 110 are programmed to only function in a designated geographic area. In some embodiments, images 110 can be embedded into hardware and only function with other hardware containing that image 110 or other images 110 designated to operate with a hardware system creating a secure closed network.

The platform processor 230 sends a message to the AI processor 205 to task the AI processor 205 to create an image 110. The AI processor 205 utilizes an aperiodic or other image data field 225 for the identification and sizing of an area used to create and test against other images 110 to create a new accounts image 110.

The AI processor 205 creates, indexes, stores, and secures the image 110 in a separate DL 240. The AI processor 205 accesses the DL 240 in response to a call from the processor 230 for an image 110 to be assigned to a new or existing account. Images 110 are part of the anticipatory data of the AI processor 205 and works in conjunction with the platform processor 203 on the monitoring and confirmation of the image 110 identified by the sensor 120 according to some embodiments.

The DL 240 is managed by the following process. In one embodiment, the AI processor 205 does not use alpha numeric file names to identify, store, and recall the account holder's data that can include but not be limited to settings, files, and requests for programs to be executed. Instead the AI processor 205 utilizes the same image 110 for an individual account holder's file identification and data storage that has been provided to the account holder by the AI processor 205 for their use outside the platform 100. The AI processor 205 creates a cryptographic blockchain ledger image (CBLI) 267 out of the individual account holder images 110 when a new account is established or additional images 110 are added to an account. The images 110 serve as the account holder's file identification that is used by the AI processor 205 to organize the storage structure within the cryptographic blockchain ledger image (CBLI) 267. The cryptographic blockchain ledger image (CBLI) 267 is also referred to herein as CBLI 267 for convenience. The AI processor 205 that created the CBLI 267 also recalls the account holder's data from the CBLI 267 when the sensor 120 has identified the image 110 and has been confirmed by the AI processor 205 and the platform systems 200 processor 230.

Figure 3:
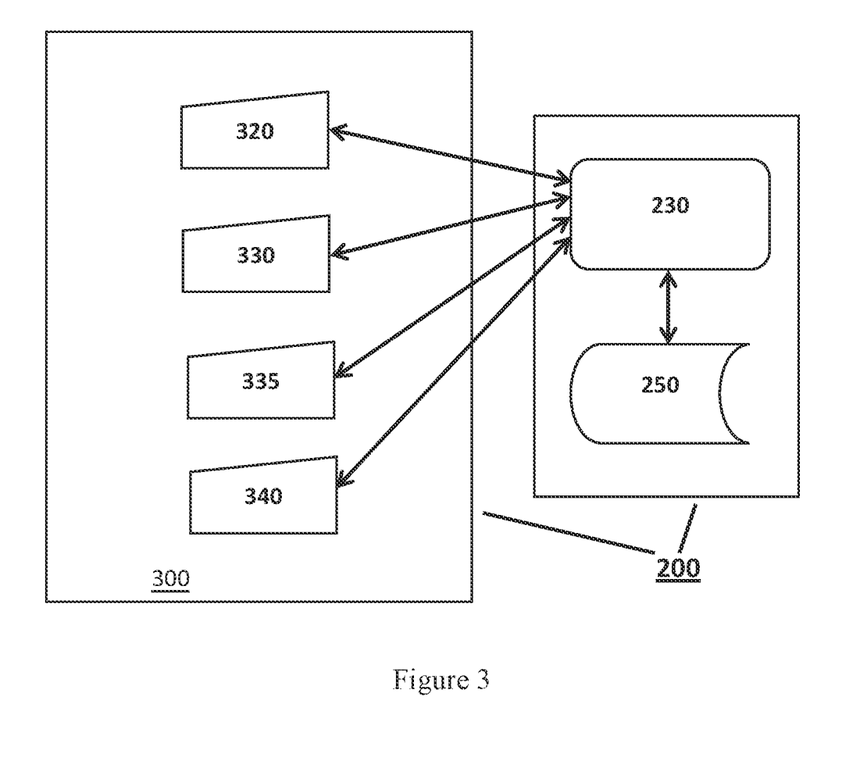
FIG. 3 is a block diagram illustrating the platform system of FIG. 2 and the settings that can be used by an account holder for a cryptographic blockchain image associated with the account holder's account according to some embodiments.

FIG. 3 is a block diagram illustrating a platform system 200 and an account holder settings interface 300 for receiving user settings that can be used by an account holder for an image 110 associated with the account holder's account.

An account holder image 110 settings interface 320 provides settings for scheduling, tasking, geophysical coverage areas, selecting different spectrum types of sensors 120 and creating different image media types (banners, stickers, blankets, electronic file images). These setting selections create pricing offers for the account holder.

An account holder communication interface 330 provides initial platform system 200 communication settings for operations that can include but not be limited to sending the following; when the image 110 is identified by a sensor 120; an email, text message that are input or electronic images, video files or other electronic files that have been uploaded by the account holder into the memory 250 through the processor 230.

An account holder payment, deposit and account balance interface 335 provides settings for payment, deposit and account balance operations that can include but not be limited transferring money or crypto currencies when the image 110 is identified by a sensor 120.

An account holder messaging interface 340 provides message settings and operations described below in conjunction with FIG. 4 when the image 110 is identified by a sensor 120.

Figure 4:
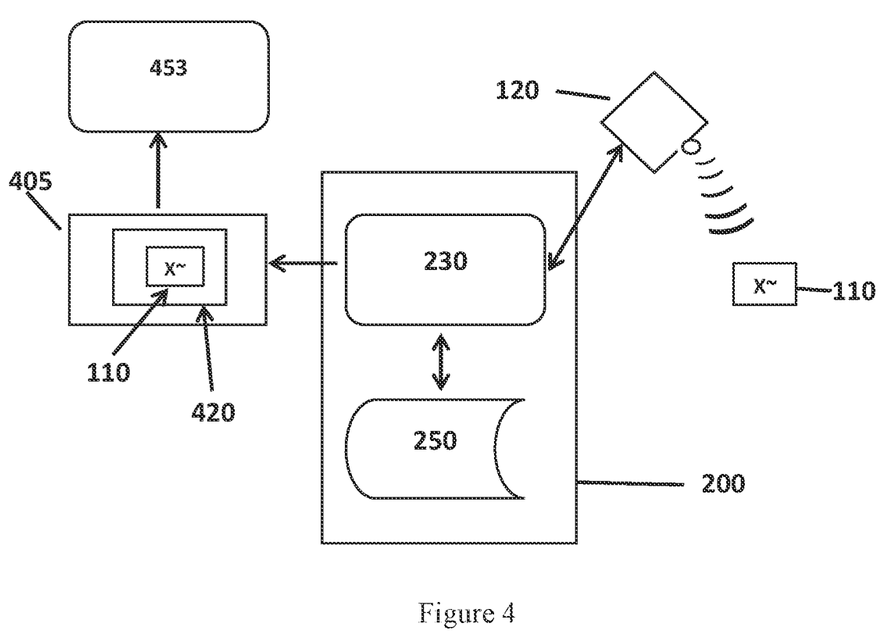
FIG. 4 is a block diagram illustrating the platform system of FIG. 2 identifying a cryptographic blockchain image and sending an electronic image of the location of the cryptographic blockchain image according to some embodiments.

FIG. 4 is a block diagram illustrating the platform system 200 sending a message 405 to an account holder device 453. The message 405 includes an electronic image 420 of the location of the image 110 identified by the sensor 120. The electronic image 420 comprises an image 110 and an area around the location of the image 110. The account holder can set the range of the electronic image 420 established around the image 110 prior to or after the electronic image 420 has been taken and program the image 110 to deliver the electronic image 420.

Figure 5:
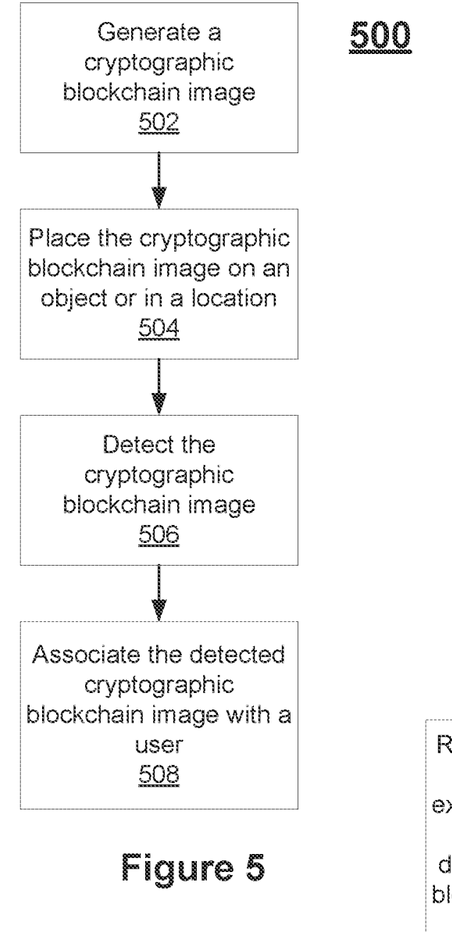
FIG. 5 is a flowchart illustrating a process of operations of a cryptographic blockchain image according to one embodiment.

FIG. 5 is a flowchart illustrating a process 500 of operations of a cryptographic blockchain image 110 according to one embodiment.

The AI system 120 generates, at 502, the cryptographic blockchain image 110, for example, in a manner as described above. Placing, at 504, the cryptographic blockchain image 110 on an object (e.g., manmade structure 165) or in a location (e.g., surface 130 or water body 150). The sensor platform 120 detects, at 506, the cryptographic blockchain image 110. The AI system 125 associates, at 508, the detected cryptographic blockchain image 110 with a user.

Figure 6:
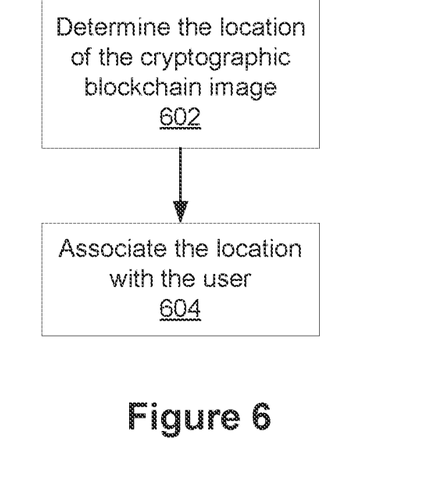
FIG. 6 is a flowchart illustrating a process of operations of locating a cryptographic blockchain image according to one embodiment.

FIG. 6 is a flowchart illustrating a process 600 of operations of locating the cryptographic blockchain image 110 according to one embodiment.

The sensor platform 120 determines, at 602, the location of the cryptographic blockchain image. The AI system 125 associates, at 604, the location with the user.

Figure 7:
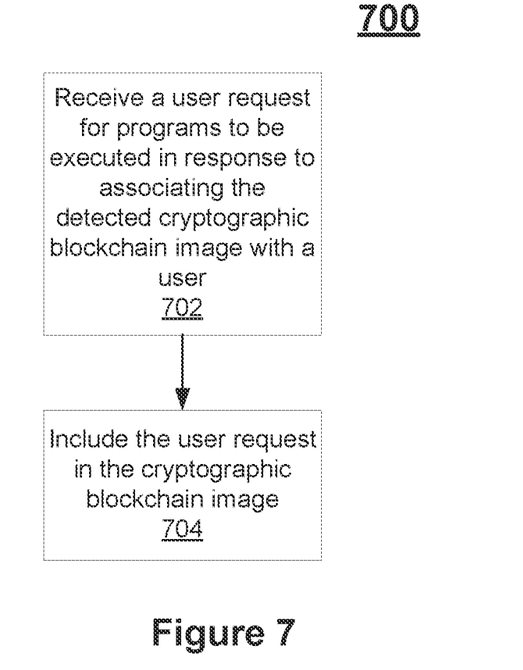
FIG. 7 is a flowchart illustrating a process of creating a cryptographic blockchain image based on a user request according to one embodiment.

FIG. 7 is a flowchart illustrating a process 700 of creating a cryptographic blockchain image 110 based on a user request according to one embodiment.

The AI system 125 receives, at 702, a user request for programs to be executed in response to associating the detected cryptographic blockchain image 110 with a user. The AI system 125 includes, at 704, the user request in the cryptographic blockchain image 110.

Figure 8:
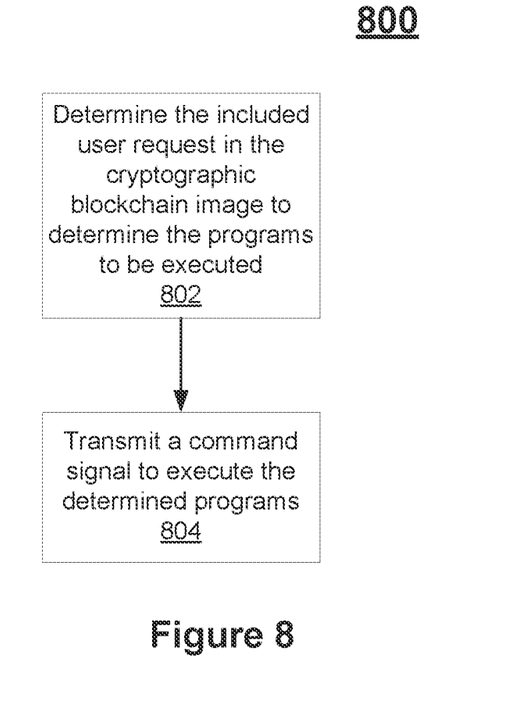
FIG. 8 is a flowchart illustrating a process of generating a communication signal based on a cryptographic blockchain image according to one embodiment.

FIG. 8 is a flowchart illustrating a process 800 of generating a communication signal based on a cryptographic blockchain image 110 according to one embodiment.

The association at 508 may include the AI system 125 determining, at 802, the included user request in the cryptographic blockchain image 110 to determine the programs to be executed. The AI system 125 transmits, at 804, a command signal to execute the determined programs.

Figure 9:
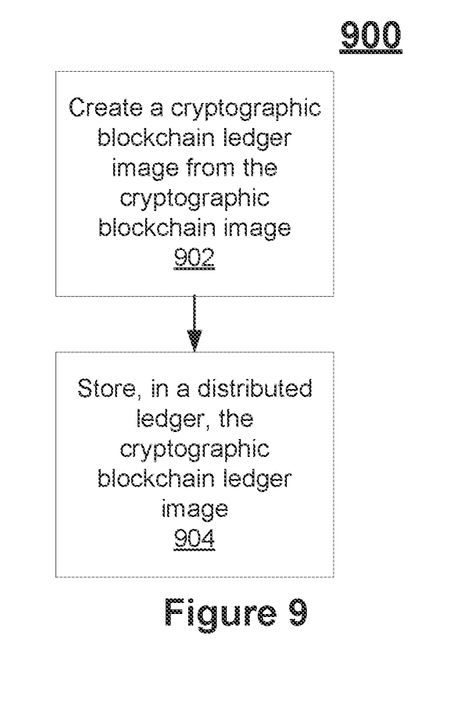
FIG. 9 is a flowchart illustrating a process of creating a cryptographic blockchain ledger image according to one embodiment.

FIG. 9 is a flowchart illustrating a process 900 of creating a cryptographic blockchain ledger image 267 according to one embodiment.

The AI system 125 creates, at 902, a cryptographic blockchain ledger image 267 from the cryptographic blockchain image 110. The AI system 125 stores, at 904, in a distributed ledger 240, the cryptographic blockchain ledger image 110.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium of any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
   generating a programmable cryptographic blockchain image in response to a user selected image;
   associating the generated programmable cryptographic blockchain image with a user;
   detecting the programmable cryptographic blockchain image that is located on an object; and
   determining the user that is associated with the detected programmable cryptographic blockchain image.

2. The method of claim 1, further comprising:
   determining the location of the detected programmable cryptographic blockchain image that is located on the object; and
   associating the determined location of the object with the user.

3. The method of claim 1, further comprising:
   receiving a user request for programs to be executed in response to determining the user that is associated with the detected programmable cryptographic blockchain image; and
   including the user request in the generated programmable cryptographic blockchain image.

4. The method of claim 3, wherein determining the user that is associated with the detected programmable cryptographic blockchain image includes:
   determining the included user request in the detected programmable cryptographic blockchain image to determine the programs to be executed; and
   transmitting a command signal to execute the determined programs.

5. The method of claim 3, further comprising:
   receiving another user request for other programs to be executed in response to determining the user that is associated with the detected programmable cryptographic blockchain image; and
   including another user request in the generated programmable cryptographic blockchain image.

6. The method of claim 1, further comprising:
   creating a cryptographic blockchain ledger image from the generated programmable cryptographic blockchain image; and
   storing, in a distributed ledger, the created cryptographic blockchain ledger image.

7. The method of claim 6, further comprising:
   using the created cryptographic blockchain ledger image as a file identifier.

8. A system comprising: a processor configured to execute computer program instructions and a non-transitory computer-readable storage medium storing computer program instructions executable by the processor to perform actions comprising:
   generating a programmable cryptographic blockchain image in response to a user selected image;
   associating the generated programmable cryptographic blockchain image with a user;
   detecting the programmable cryptographic blockchain image that is located on an object; and
   determining the user that is associated with the detected programmable cryptographic blockchain image.

9. The system of claim 8 wherein the instructions further cause the actions of:
   determining the location of the detected programmable cryptographic blockchain image that is located on the object; and
   associating the determined location of the object with the user.

10. The system of claim 8, wherein the instructions further cause the actions of:
    receiving a user request for programs to be executed in response to determining the user that is associated with the detected programmable cryptographic blockchain image; and
    including the user request in the generated programmable cryptographic blockchain image.

11. The system of claim 10, wherein the instructions further cause the actions of:
    determining the included user request in the detected programmable cryptographic blockchain image to determine the programs to be executed; and
    transmitting a command signal to execute the determined programs.

12. The system of claim 10, wherein the instructions further cause the actions of:

receiving another user request for other programs to be executed in response to determining the user that is associated with the detected programmable cryptographic blockchain image; and including another user request in the generated programmable cryptographic blockchain image.

13. The system of claim 8, wherein the instructions further cause the actions of:

creating a cryptographic blockchain ledger image from the generated programmable cryptographic blockchain image; and storing, in a distributed ledger, the created cryptographic blockchain ledger image.

14. A non-transitory computer-readable storage medium storing computer program instructions executable by a processor to perform actions comprising:

generating a programmable cryptographic blockchain image in response to a user selected image;

associating the generated programmable cryptographic blockchain image with a user;

detecting the programmable cryptographic blockchain image that is located on an object; and determining the user that is associated with the detected programmable cryptographic blockchain image.

15. The non-transitory computer-readable storage medium of claim 14 wherein the instructions further cause the actions of:

determining the location of the detected programmable cryptographic blockchain image that is located on the object; and associating the determined location of the object with the user.

16. The non-transitory computer-readable storage medium of claim 15, wherein the instructions further cause the actions of:

receiving another user request for other programs to be executed in response to determining the user that is associated with the detected programmable cryptographic blockchain image; and including another user request in the generated programmable cryptographic blockchain image.

17. The non-transitory computer-readable storage medium of claim 14, wherein the instructions further cause the actions of:

receiving a user request for programs to be executed in response to determining the user that is associated with the detected programmable cryptographic blockchain image; and including the user request in the generated programmable cryptographic blockchain image.

18. The non-transitory computer-readable storage medium of claim 17, wherein the instructions further cause the actions of:

determining the included user request in the detected programmable cryptographic blockchain image to determine the programs to be executed; and transmitting a command signal to execute the determined programs.

19. The non-transitory computer-readable storage medium of claim 14, wherein the instructions further cause the actions of:

creating a cryptographic blockchain ledger image from the generated programmable cryptographic blockchain image; and storing, in a distributed ledger, the created cryptographic blockchain ledger image.

\* \* \* \* \*